Dec. 3, 1957  E. J. SIMANEK ET AL  2,815,094
BOLSTER MOUNTED CLASP BRAKE ARRANGEMENT
Filed May 26, 1954  2 Sheets-Sheet 1

INVENTORS.
Edward J. Simanek
Robert W. Lanman
By Orrin O. B. Garner Atty.

Dec. 3, 1957  E. J. SIMANEK ET AL  2,815,094
BOLSTER MOUNTED CLASP BRAKE ARRANGEMENT
Filed May 26, 1954  2 Sheets-Sheet 2
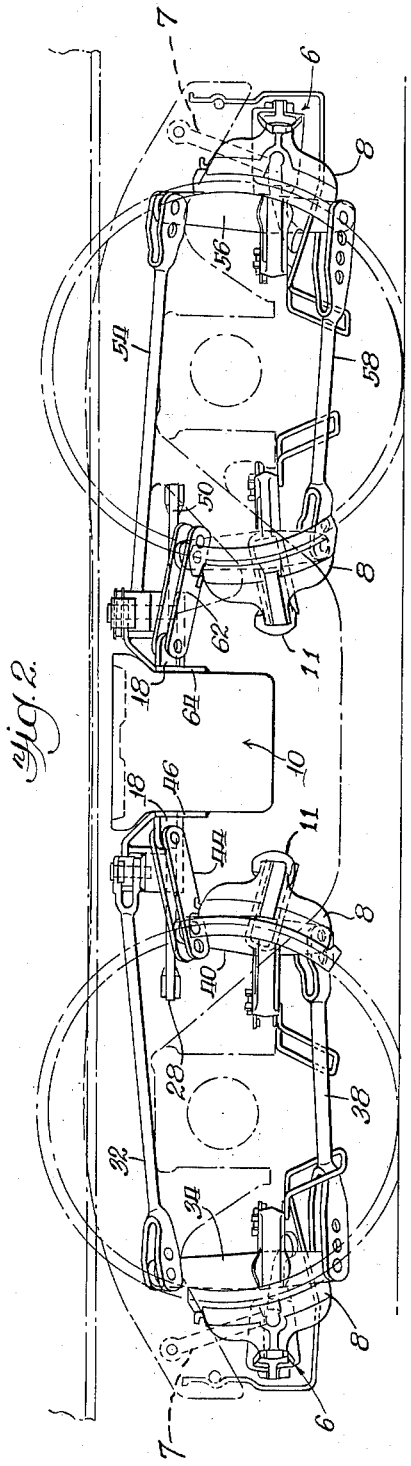
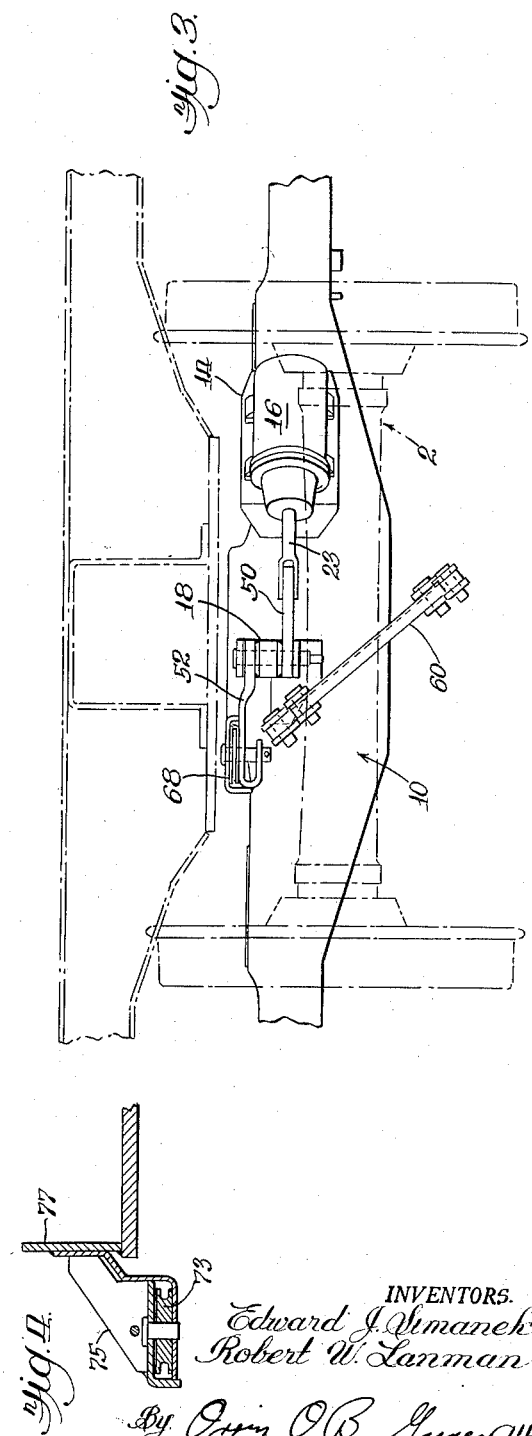
INVENTORS.
Edward J. Simanek
Robert W. Lanman
By Orrin O.B. Garner Atty.

United States Patent Office 2,815,094
Patented Dec. 3, 1957

2,815,094

BOLSTER MOUNTED CLASP BRAKE ARRANGEMENT

Edward J. Simanek, Chicago, Ill., and Robert W. Lanman, Hammond, Ind., assignors to American Steel Foundries, Chicago, Ill., a corporation of New Jersey Application May 26, 1954, Serial No. 432,492

2 Claims. (Cl. 188—56)

The invention relates to a railway car brake and more particularly to that type of brake known as a clasp brake.

The invention comprehends the utilization of a bolster mounting for a unit cylinder which, in turn, is operative to actuate a braking system for a wheel and axle assembly of a conventional railway car truck. Additionally, the invention comprehends a novel angle mounting on the bolster of said truck for the unit actuating cylinder. The invention further incorporates with said novel brake mechanism a new and positive acting hand or manual brake actuation arrangement.

Accordingly, it is a primary object of the invention to provide a conventional railway car truck with a novel clasp brake system.

It is a further object of the invention to provide a novel linkage arrangement for said clasp brake system.

It is a specific object of the invention to provide a positive acting hand brake actuating arrangement incorporated with said braking system.

These and other objects of the invention will become apparent in the course of the following description and from an examination of the concerned drawings, wherein:

Figure 2 is a side elevational view of the structure shown in Figure 1;

Figure 3 is a fragmentary sectional view taken approximately along line 3—3 of Figure 1 with the beam removed, and Figure 4 is a sectional view taken along line 4—4 of Figure 1.

Figure 1:
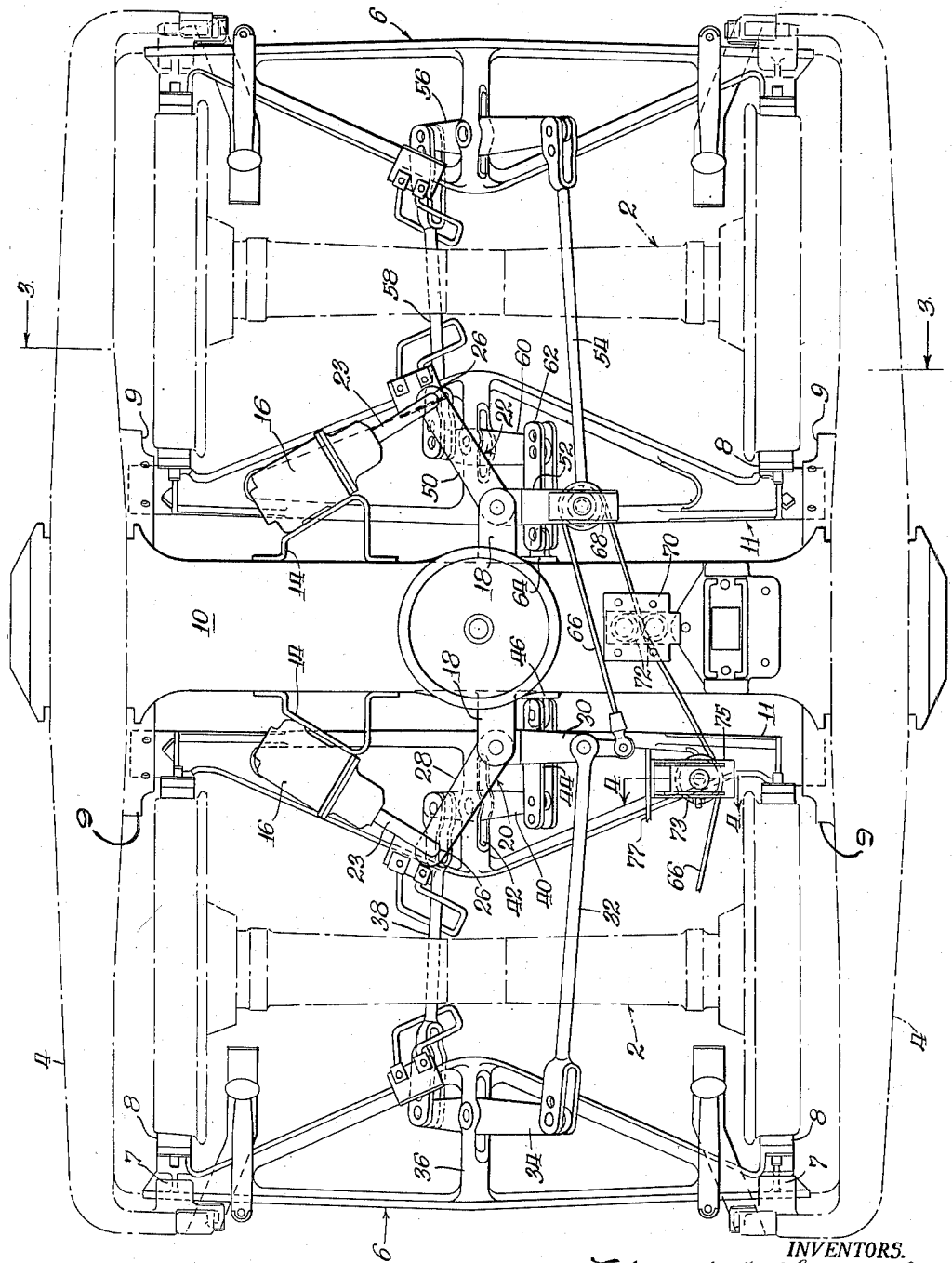
Figure 1 is a top plan view illustrating a railway car truck with the particular brake mechanism incorporated therewith.

Describing the invention in detail, a railway car truck comprises a pair of wheel and axle assemblies indicated generally at 2, said assemblies carrying in the usual manner (not shown) a frame 4. A brake beam, indicated generally at 6, is conventionally mounted adjacent each end of the truck by means of swing hangers 7 which are pivotally attached to the related end of the beam and have their upper ends fulcrumed to adjacent ends of the frame 4. Each brake beam 6 carries, at the opposite ends thereof, standard brake head-brake shoe assemblies 8, said assemblies 8 engaging the tread of the related wheels during the actuation of the brake mechanism hereinafter described.

A bolster 10 is mounted centrally of the truck and extends transversely thereof, having its opposite ends spring-supported (not shown) from the frame in the usual manner as is well understood by those skilled in the art. The frame 4 is provided with brackets 9 on opposite sides of and below the bolster 10, said brackets offering slidable support for associated brake beams, indicated generally at 11. The beams 11 also carry brake head-brake shoe assemblies 8 on their opposite ends, said assemblies 8 being brought into engagement with the tread of the related wheels during the brake actuation hereinafter described. Thus it will be seen that the brake beams 6 and 11 associated with each wheel and axle assembly 2 cooperate to clasp the wheel treads of said assemblies to decelerate the truck.

Brackets 14, 14 are provided on opposite sides of the bolster 10 offset laterally from the central portion of said bolster, said brackets 14 offering mountings for brake cylinders 16, 16 directly on the bolster. It should be noted that brackets 14 are so arranged that the longitudinal axis of the related brake cylinder 16 extends at an acute angle (substantially 30°) with the transverse vertical center plane of the bolster 10.

Mounting bosses 18, 18 are also carried on opposite sides of the bolster 10 in spaced relation with the brackets 14, said mounting bosses 18 serving to pivotally carry related bell crank levers 20 and 22. Extending from the inboard ends of each actuating cylinder 16 are piston rods 23, said piston rods being horizontally movable and pivotally connected at their inboard ends to the adjacent ends of the related bell cranks 20 and 22 as at 26.

Considering first the bell crank 20 as seen in the left-hand portion of Figure 1, it will be noted that said crank comprises angularly related arms 28 and 30, said arm 30 having a pivotal connection intermediate the ends thereof to one end of pull rod 32. Pull rod 32 extends longitudinally of the truck above the axle of the wheel and axle assembly 2 and has its opposite end connected to the upper end of a truck lever 34, said truck lever being conventionally and pivotally connected intermediate its ends to a central strut 36 of the related outboard brake beam 6. The truck lever 34 also extends below the brake beam 6 and is pivotally connected at its lower end to another pull rod 38, said other pull rod 38 extending longitudinally of the truck to pivotally connect with the lower end of a truck lever 40 which, in turn, is pivotally connected intermediate its ends to a central strut 42 of the related inboard brake beam 1. Additionally, the truck lever 40 extends upwardly, as best seen in Figure 2, to pivotally connect at its upper end to a dead lever arm 44 which, in turn, is fulcrumed to a bracket at 46 carried by the bolster 10.

Considering the bell crank lever 22 on the right-hand portion of the truck as seen in Figure 1, it will be noted that said bell crank comprises angularly related arms 50 and 52, said arm 50 being pivotally connected at 26 to the related piston rod of the associated unit operating cylinder. The arm 52 is pivotally connected at its outer end to one end of a pull rod 54, said pull rod 54 extending longitudinally of the truck above the related axle of the wheel and axle assembly 2 and having its opposite ends pivotally connected to a truck lever 56 associated with the outboard right-hand brake beam 6. The truck lever 56 extends below the related brake beam 6 to pivotally connect with another pull rod 58, said other pull rod extending longitudinally of the truck and connecting its opposite end to a lower end of a truck lever 60 which is also pivotally mounted intermediate its ends to the related right-hand inboard brake beam 11. The truck lever 60 extends upwardly above the related brake beam 11 to pivotally connect at its upper end with the dead lever arm 62 which, in turn, is fulcrumed from a bracket 64 carried by the bolster 10. Thus it will be seen that the brake actuating linkages on both ends of the truck are substantially identical in structure and in function.

Considering now the hand brake arrangement, it will be seen that the arm 30 of the bell crank 20 has connected on its outboard end a flexible cable 66, said flexible cable extending longitudinally of the truck to engage a pulley 68, which is mounted on the outboard end of the arm 52 of the bell crank 22. The cable 66 after surrounding the pulley 68 is threaded through a cable guide 70, said guide comprising rollers 72 embracing cable 66. It will be noted that cable guide 70 is mounted on the upper side of the bolster 10. The cable 66 is then extended to associate with a pulley 73, the pulley 73 being carried by a bracket 75 in turn carried by the car truck indicated fragmentarily at 77, as best seen in Figure 4. The cable 66 is then connected (not shown) to an associated hand brake mechanism.

In the operation of the primary braking arrangement, it will be seen that each actuating cylinder 16 may be energized pivoting the related bell cranks 20 or 22 about their associated fulcrums on the bolster. Directing attention to the left-hand brake arrangement, the bell crank 20 is pivoted about fulcrum 18 in a counterclockwise direction, whereby the pull rod 32 is carried longitudinally to the right of the truck as seen in Figure 1. Movement of the pull rod 32 to the right causes the connected lever 34 to pivot in a clockwise direction, as seen in Figure 2, about its fulcrum on the related brake beams 6. This motion of the truck lever 34 causes the pull rod 38 to move longitudinally of the truck, to the left as seen in Figure 2, which in turn causes the truck lever 40 to move in a clockwise direction about its pivot point associated with the right-hand brake beam 6. This clockwise motion of the lever 40 is transferred to a fulcruming action about the pivotal connection to the bolster mounted dead lever 44, bringing the associated brake beam 11 and carried shoe assemblies 8 into engagement with the tread of the related wheel. The reactive force 2 in the linkage after the wheel engagement of the right-hand inboard brake beam 11 and continued motion of the bell crank 20 and connected pull rod 32 carries the left-hand or outboard brake beam 6 and its shoe assembly to the right and into engagement with the opposite sides of the related wheels of the wheel and axle assemblies. The right-hand brake beam brake mechanism, as seen in Figure 1, functions identically with that above described, hence need not be set out in particular.

To actuate the hand brake, the cable 66 is moved to the left as seen in Figure 1. Leftward movement of the outboard portion of cable 66 causes the bell crank lever 20 to move in a counterclockwise or brake-actuating direction, as seen in Figure 1, thus inducing movement of the left-hand brake beams 6 and 11 much in the same manner as above described. The reactive force set up by the engagement of the left-hand brake arrangement and continued motion of the cable 66 to the left causes the right-hand bell crank 22 to pivot in a clockwise or brake actuating direction about its related fulcrum 18. This, in turn, actuates the right-hand brake mechanism causing engagement with the related wheels. It will be understood that the above action is virtually simultaneous upon movement of the hand brake actuating cables 66.

Release of either the primary or hand brake actuating means for the respective brake arrangements results in just the opposite action as above described and the related brake means move out of engagement with the associated wheels.

We claim:
1. In a clasp brake arrangement for a railway car truck comprising a frame having a pair of longitudinally extending members interconnected by at least one transversely extending member, and at least one wheel and axle assembly supporting the frame, the combination of: a pair of brake beams disposed on opposite sides of said assembly and carrying brake means engageable therewith, a pair of live and dead brake levers fulcrumed to the respective beams, means interconnecting the respective brake levers, the dead brake lever being fulcrumed at its upper end to the car, a power cylinder mounted on the transverse member and disposed between the longitudinally extending members with its operating axis forming an angle of substantially 30° with the longitudinal axis of the transverse member, and a dead bell crank cylinder lever fulcrumed intermediate its ends to the transverse member and being operatively connected adjacent its opposite ends to the cylinder and the upper end of the live brake lever, respectively.

2. In a clasp brake arrangement for a railway car truck comprising a frame having a pair of longitudinally extending members interconnected by at least one transversely extending member, and at least one wheel and axle assembly supporting the frame, the combination of: a pair of brake beams disposed on opposite sides of said assembly and carrying brake means engageable therewith, a pair of live and dead brake levers fulcrumed intermediate their ends to the respective beams, a tension rod interconnecting the lower ends of the brake levers, the dead brake lever being fulcrumed at its upper end to the transverse member, a second tension rod having one end pivotally connected to the upper end of the live brake lever, a power cylinder mounted on the transverse member and disposed between the longitudinally extending members with its operating axis forming an angle of approximately 30° with the longitudinal axis of the transverse member, a dead bell crank cylinder lever fulcrumed intermediate its ends to the transverse member and being connected adjacent its opposite ends to the cylinder and the other end of the second tension rod, respectively, the connections between the bell crank lever and the cylinder, transverse member, and second tension rod all being in close proximity to each other.

References Cited in the file of this patent

UNITED STATES PATENTS

| | | |
|---|---|---|
| 2,086,842 | Baselt | July 13, 1937 |
| 2,168,294 | Kiesel | Aug. 1, 1939 |
| 2,242,853 | Flowers | May 20, 1941 |
| 2,266,701 | Baselt | Dec. 16, 1941 |
| 2,269,618 | Busch | Jan. 13, 1942 |